United States Patent

Liu et al.

[11] Patent Number: 5,905,721
[45] Date of Patent: May 18, 1999

[54] METHODS FOR CHANNEL ESTIMATION AND SIGNAL DETECTION OF CDMA SIGNALS

[75] Inventors: Hui Liu; Guanghan Xu, both of Austin, Tex.

[73] Assignee: Cwill Telecommunications, Inc., Austin, Tex.

[21] Appl. No.: 08/719,820

[22] Filed: Sep. 26, 1996

[51] Int. Cl.[6] .................................................. H04B 1/707
[52] U.S. Cl. ........................... 370/342; 375/349; 375/206
[58] Field of Search ..................................... 370/320, 335, 370/342, 491, 500; 375/206, 346, 347, 348, 349; 455/506

[56] References Cited

U.S. PATENT DOCUMENTS

| 5,260,968 | 11/1993 | Gardener et al. | 375/200 |
| 5,677,930 | 10/1997 | Bottomley | 375/208 |
| 5,680,419 | 10/1997 | Bottomley | 375/347 |

OTHER PUBLICATIONS

Lupas, R. et al., Linear Multiuser Detectors of Synchronous Code–Division Multiple Access Channels, IEEE Transactions on Information Theory, vol. 35, No. 1, pp. 123–136, Jan. 1989.

Xie, Z., Short, R. et al., A Family of Suboptimun Detectors for Coherent Multiuser Communications. IEEE Journal on Selected Areas in Communications, vol. 8, No. 4, pp. 683–690, May, 1990.

Zvran, Z., et al., Suboptimum Multiuser Detector for Synchronous CDMA Frequency–Selective Rayleigh Fading Channels. Globecom Mini–Conference on Communication Theory, pp. 82–86, 1992.

Mirta, U. et al. Adaptive Receiver Algorthms for Near–Far Resistant CDMA. IEEE Transactions on Communications, vol. 43, No. 2/3/4, pp. 1713–1724, Apr. 1995.

Abdulraham, M. et al., Equalization for Interference cancellation in Spread Spectrum Multiple Access Systems., Proc. VTC'92, pp. 71–74, May 1992.

Rapajic, P. et al., A Linear Adaptive Fractionally Spaced Single User Receiver for Asynchronous CDMA Systems, IEEE International Symposium on Information Theory, p. 45, Jan. 1993.

Honig, M. et al., Blind Adaptive Interference Suppression for Near–Far Resistant CDMA, Proc. Globecom'94, pp. 379–384, 1994.

Tong, L. et al., Blind Identification and Equalization Based on Second–Order Statistics: A Time Domain Approach, IEEE Transactions on Information Theory, pp. 340–349, Mar., 1994.

Liu, H. et al., Recent Developments in Blind Channel Equalization: From Cyclostationarity to Subspaces, Signal Processing, pp. 83–99, Jun. 1996.

*Primary Examiner*—Min Jung

[57] ABSTRACT

A method and apparatus for increasing the capacity and quality of code-division-multiple-access (CDMA) communications in a near-far and frequency-selective fading environment is disclosed. The invention can be utilized in both synchronous and asynchronous CDMA systems. For convenience, only applications of this invention to synchronous CDMA are described herein. Unique to this invention is that using measurements from a receiver and multiple receivers at the base station, propagation channel parameters associated with a plurality of subscribers are determined without the use of training sequences. The channel parameters are used to calculate any individual user's signature waveform and reconstruct its transmitted signal from the received data. This invention can also be implemented at base stations with multiple antennas or/and fractionally spaced measurements to further improve signal quality by incorporating spatial and temporal diversities. When used at the mobile sites, the invention can alleviate the synchronization problem and mitigating frequency-selective fading.

4 Claims, 3 Drawing Sheets

METHODS FOR CHANNEL ESTIMATION AND SIGNAL DETECTION OF CDMA SIGNALS

BACKGROUND OF THE INVENTION

The invention described in this patent application relates to the field of code-division-multiple-access (CDMA) wireless systems with multipath fading, and in particular to a method for estimating signature waveforms associated with the subscribers by means of subspace decomposition and least-squares fitting.

The rapid increase in the number of users of mobile telephones, personal communication services (PCS), etc., places challenging demands on future wireless services. Viewed as the generic next generation commercial multiplexing scheme, CDMA offers the promises of efficient use of the available bandwidth, inherent resistance to interference and adaptability to variable traffic patterns. If all mobile radio signals arriving at the base station are synchronized to within a small fraction of a chip-time interval, then it is possible to reduce the level mutual interference dramatically. For such synchronous CDMA (S-CDMA) systems, the use of orthogonal codewords can enhance performance to a greater degree than in asynchronous-CDMA systems (M K. Simon et al, "Spread Spectrum Communications Handbook", McGraw-Hill, New York, N.Y., revised edition, 1994).

In some applications where multipath delays are not negelible, it is normally difficult to maintain the low cross correlation among subscribers' signature waveforms since communication channels are subject to frequency-selective fading. Signal reception using conventional matched filters may suffer severe performance degradation due to mutual interference, especially in a near-far situation (e.g., weak CDMA signals can be overwhelmed by strong power signals in the same system). To mitigate this problem, multiuser detection/equalization needs to be performed to cope with frequency-selective fading. A class of multiuser receivers have been developed. The most prominent ones among many other include R. Lupas and S. Verdú, "Linear multiuser detectors for synchronous CDMA channels"*IEEE Trans. on Information Theory*, 1(35):123–136, January 1989.; Z. Xie et al, "A family of sub-optimum detectors for coherent multiuser communications", *IEEE J. Selected Areas in Communications*, pages 683–690, May 1990; and Z. Zvonar and D. Brady, "Suboptimum multiuser detector for synchronous CDMA frequency-selective Rayleigh fading channels", *Globecom Mini-Conference on Communications Theory*, pages 82–86, 1992.

Almost all the multiuser detectors require explicit knowledge of all users' signature waveforms which is the convolution of the multipath channels and the users' spreading codes. The signature waveforms distinct one CDMA signal from another. Conventional approaches for estimating the signature waveforms in a possibly time-varying environment, e.g., mobile applications, rely on a periodic transmission of a pilot signal (training sequence); the procedure is standard and can be found in a number of texts (e.g., see S. Haykin, "Adaptive Filter Theory", Prentice-Hall, Englewood Cliffs, N.J., second edition, 1991). The price paid is a significant reduction in channel efficiency and system robustness. As the rate of channel variations increases, the use of training sequences may become prohibitive. Also, the training sequences in the CDMA environments are not so effective as in the TDMA (Time-Division-Multiple-Access) scenarios due to high interference level in the CDMA environments. Adaptive multiuser detection has been proposed to combat fast fading channels. Recently developed algorithms include U. Mitra and H. V. Poor, "Adaptive receiver algorithm for near-far resistant CDMA", *IEEE Trans. on Communications*, 43(4):1713–1724, April 1995; M. Abdulrahman et al, "Equalization for interference cancellation in spread spectrum multiple access systems", *Proc. VTC'92*, pages 71–74, May 1992; P. Rapajic and B. Vucetic, "A linear adaptive fractionally spaced single user receiver for asynchronous CDMA systems", *IEEE Int. Symp. on Information Theory*, page 45, January 1993; and Honig et al, "Blind adaptive interference suppression for near-far resistant CDMA", *Proc. Globecom'94*, pages 379–384, 1994. Despite its success in some scenarios, the adaptive reception scheme still requires pilot signals to obtain a precise estimate of the signature waveform, at least that of a desired user.

Currently state-of-the-art technology can determine the channel without the use of a training sequence (herein referred to as blind identification). One of the earliest approach which utilizes low-order statistics was introduced by Tong et al., (Tong et al., "Blind Identification and Equalization Based on Second-Order Statistics: A Time Domain Approach", IEEE Trans. on Information Theory, March, 1994). Latest results show that the requirement for input statistics can be eliminated—blind identification can be accomplished based solely on a limited number of outputs (H. Liu et al, "Recent Developments in Blind Channel Equalization: From Cyclostationarity to Subspaces", Signal Processing, pages 83–99, June, 1996). Unfortunately, none of the algorithms to date can handle multiuser CDMA communications.

In view of the basic principle that a CDMA system requires the signature waveform information at the base-station for reliable signal detection, and the fact that training sequence-based techniques are cumbersome in wireless communications, the lack of data efficient blind techniques has become a serious barrier to the implementation of a CDMA system in a frequency-selective environment. There is a critical need for new technology to effectively determine multiuser channel parameters and signature waveforms without the use of the training sequence. The current invention directly addresses this need. Here, we present a blind technique which provides closed-form estimates of the signature waveforms for an almost synchronized CDMA system. Our approach is deterministic in the sense that no noise or signal statistics are required for the estimation. The estimation is accomplished by exploiting the fact that the user's signature waveform is confined to a subspace defined by the its associated code. The principal advantage of this approach is that it is highly data efficient and most suitable for a rapidly changing environment. In particular, it can determine the signature waveform with the number of data samples as small as the number of co-channel users.

SUMMARY OF THE INVENTION

The present invention is directed to a method for identifying the signature waveforms in CDMA communications based solely on the system outputs. One of its major applications is in the field of mobile communications where the propagation channel characteristics vary with environmental variations. Though the invention is not restricted to this area, it forms an appropriate basis for a description of the method in the context of wireless systems.

First, we define two terms which are employed in the following discussion. The term wireless channel or simply channel (mathematically denoted as h(t)) refers to the composite transfer function between the subscriber and the base-station antenna(s), while the term signature waveform (mathematically denoted as w(t)) refers to the characteristic CDMA waveform associated with each subscriber. A signature waveform is uniquely defined by user's spreading codes and corresponding channel function; see FIG. 3.

The basic properties of the invention may be summarized as follows:

1. The new method yields channel parameter and signature waveform estimates for all active subscribers in a CDMA system without requiring any knowledge of the inputs, thus eliminating the need for a training sequence. Consequently system performance, i.e., capacity, reliability and flexibility, is enhanced without introducing undue hardware complexity.
2. The new method is deterministic and in closed-form, which means that it is highly data efficient and can accomplish signature waveform estimation without cumulative statistics and iteration—a feature particular attractive to fast changing wireless environment.
3. The new method is extendable to an antenna array or/and fractionally spaced systems to incorporate additional diversities, e.g., space and time diversities, for further enhancement in performance.

The invention essentially consists of the procedure of estimating the signature waveforms using the subspace information of the data matrix, and detection of the transmitted symbols from the data samples based on the estimated signature waveforms. The only requirement is that (i) the channels have a finite impulse response (FIR) with length insignificant compared to the duration of a symbol period; and (ii) direct path signals from all users are approximately synchronized at the symbol level. Both assumptions are plausible for most wireless applications.

For a CDMA system which meets the specifications outlined above, the receiver outputs are processed in order to obtain the parameter estimates of interest. The estimation is accomplished by exploiting the fact that the user's signature waveform is uniquely identifiable given subspace information of the covariance matrix of the measurements and user's spreading codes. The procedure for obtaining the parameter estimates may be outlined as follows:

1. Using measurements from a base station receiver, form data vectors by stacking chiprate data samples within a symbol period. Determine the auto-covariance matrix of the measurement vectors.
2. Determine the orthogonal subspace of the covariance matrix using the mathematically well-known eigenvalue decomposition.
3. Construct a set of linear equations based on the orthogonal subspace a code matrix. Identify the channel vector associated with the ith user as the least-squares solution of the linear equations.
4. Next, the ith subscriber's signature waveform vector is readily reconstructed as the product of the estimated channel vector and the kernel matrix.
5. Steps 3 and 4 are then repeated for each subscriber, thereby allowing multiuser receivers to be calculated based on the signature waveform estimates.

Thus, two essential steps are employed in determining the signature waveform for each subscriber, namely, subspace decomposition and least-squares fitting. Although the invention is designed to handle a single-receiver and almost synchronous CDMA systems, the subspace technique can be applied to the problem of multi-receiver (physical or virtual) asynchronous CDMA in a straightforward manner as follows:

1. Construct a super data vector by stacking data samples within a symbol period from all receivers.
2. Determine each user's channel vector and subsequently the signature waveform vector by solving a least-squares fitting problem.
3. Perform signal detection for each user based on users' signature waveforms which now present both code and temporal/spatial characteristics of the users.

More objects and advantages of the invention will become apparent from ensuing detailed mathematical description and implementation examples. Though the invention is described in the context of wireless communications, there are a number of other applications such as underwater acoustics and seismic analysis can benefit from this invention. The ability of separating co-channel signals of this invention makes it possible to be utilized in any multiuser applications with distinctive signal waveforms.

DETAILED DESCRIPTION OF THE DRAWINGS

Figure 1:
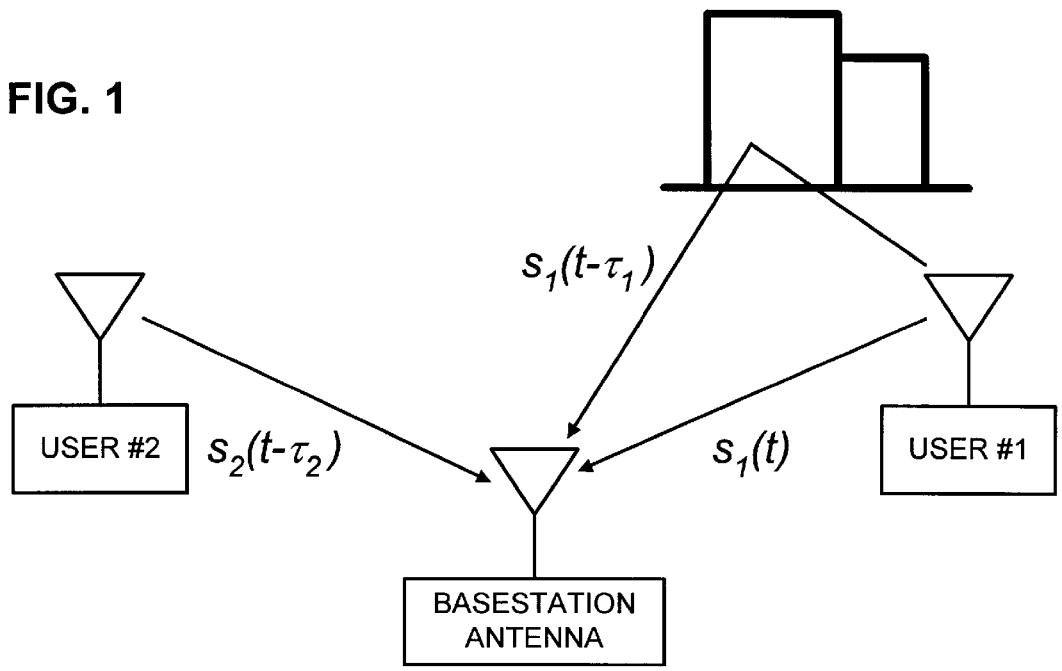
FIG. 1 is a graphic representation of the problem of synchronous CDMA communications in a frequency-selective environment. For simple illustration, Only two sources are present for illustration simplicity. The signal that observed by the base station antenna is the superposition of source signal from direct paths as well as their multipath reflections.

FIG. 1 shows an example of a CDMA wireless network and the key factors that affect the operations of CDMA communications. A plurality of subscribers (two in the current figure) transmit CDMA signals simultaneously through frequency-selective fading channels. The signal that reach the base station antenna is the superposition of all direct path signals as well as their multipath reflection components. In a typical CDMA scenario, information bearing symbols from each user are characterized by a unique signature waveform that allow them to be detected from the superimposed signals. However, multipath reflection, timing offsets of direct paths, as well as other environmental factors may alter the transmitted waveforms in an unpredictable fashion and thus degrade the performance of signal detection.

Figure 2:
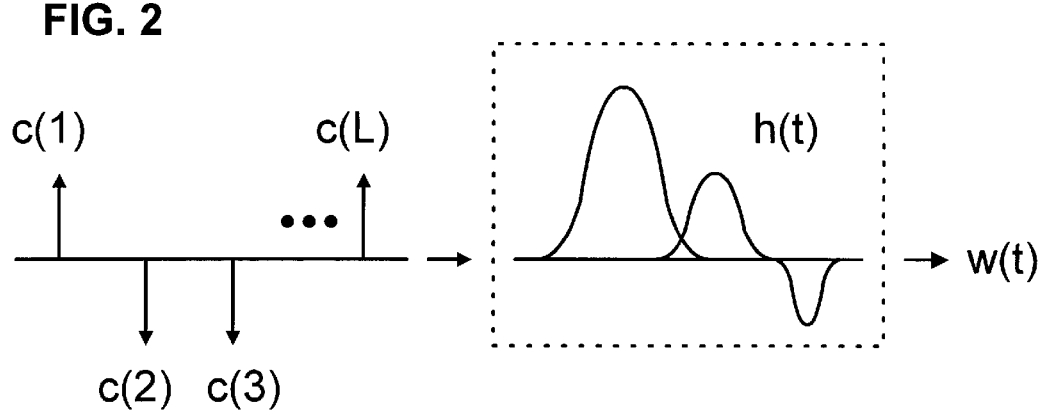
FIG. 2 is a graphic representation of how environmental variations due to the presence of multipath and timing offsets affect a signature waveform.

The above problem is illustrated in FIG. 2 in more details. In an ideal scenario, the signature waveform of a CDMA signal (denoted as w(t)) is uniquely determined by a user's spreading code, $\{c(l)\}_{l=1}^{L}$, usually assigned by the base station, and a carefully designed pulse shaping function. In reality, h(t) varys as the environment changes due to multipath fading and propagation delays. The resulting signature waveform, which is essential to CDMA signal detection, is thus unknown and needs to be identified. It is worth pointing out that despite the stochastic nature of the propagation channel, a signature waveform always bears certain structures due to the known code.

Figure 4:
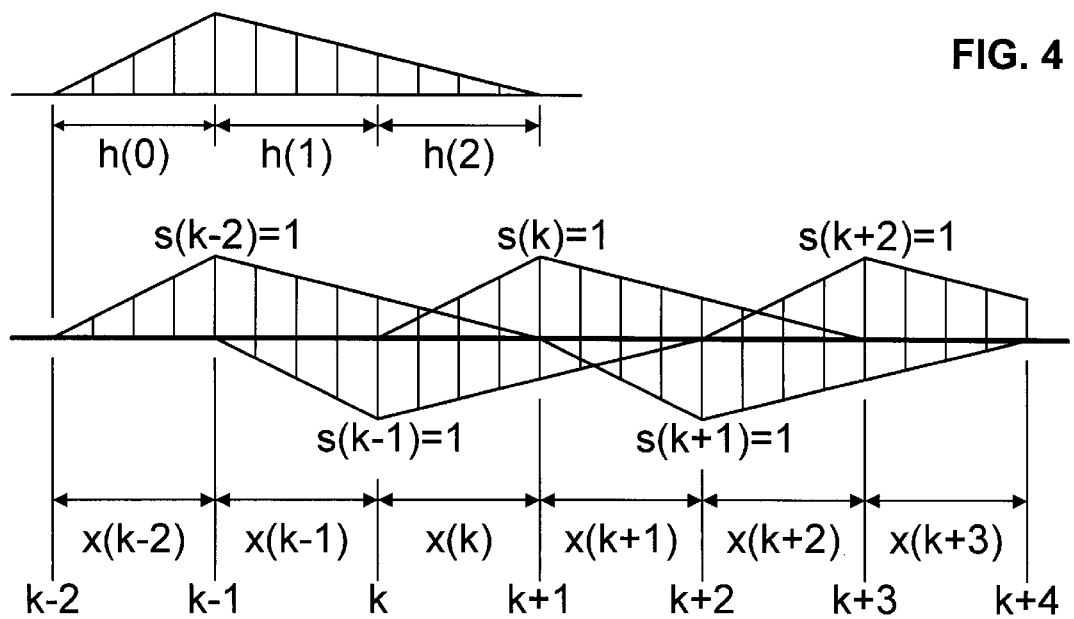
FIG. 4 is a graphic illustration of the interchip interference introduced by frequency-selective channels and the fractionally-spaced sampling technique.

As will be described in more detailed in the ensuing sections, the current invention is applicable to multichannel systems where the base station employs an array of antennas or/and oversampling techniques. FIG. 4 illustrates how oversampling provides fractionally-spaced measurements. In this particular illustration, 4 samples are collected within each chip duration. By regarding the measurements as chip-rate samples from 4 virtual receivers, the outputs are effectively equivalent to a 4-element antenna array system.

Figure 3:
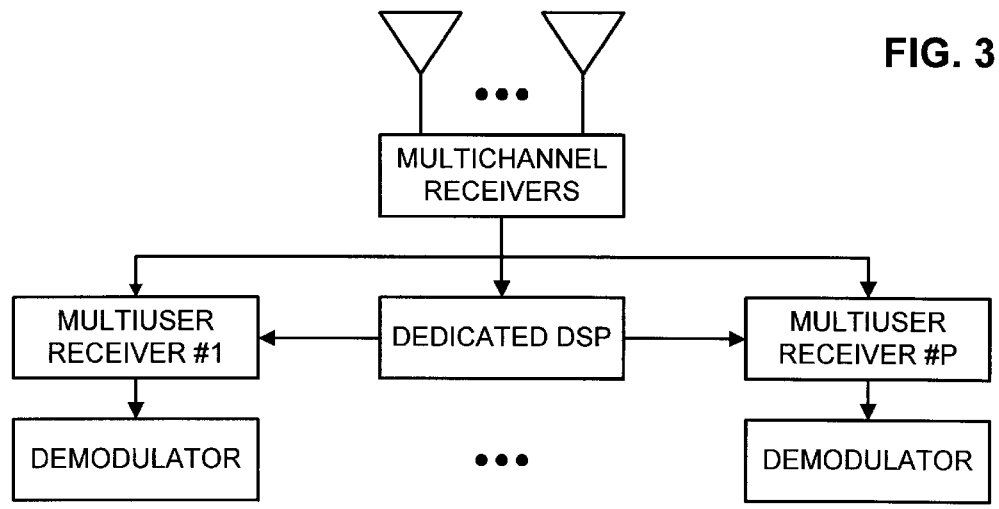
FIG. 3 is a block diagram of the S-CDMA receivers in accordance with the invention.

The current invention is directed at the estimation of signature waveforms from signals received by the base station receiver(s). FIG. 3 shows a implementation diagram of the invention. As indicated above, the invention is applicable to single-receiver as well as multi-receiver and/or fractionally spaced systems. For generality, a multiple antennas base station is illustrated. The multichannel receiver takes the sample measurements and direct them to a dedicated computation engine (e.g., a digital signal processor, shorthanded as DSP) and a set of CDMA multiuser receivers. The dedicated DSP is devoted to estimating the signature waveforms and further calculating the optimum receiver filters for all users. The resulting filter parameters are then distributed to individual receivers to extract transmitted signal from each user. The filter output is then applied to a demodulator to recover the information bearing symbol sequences. The dedicated DSP can include multiple computing engines for realization of parallel processing.

PROBLEM FORMULATION

The basic problem under consideration is that of estimation of signature waveforms in CDMA communications given measurements from system outputs; see FIG. 1. This general problem appears in many different fields including cellular, satellite, wireless LAN communications, etc. Our goal here is to develop data efficient signature waveform estimation without the use of training sequences. As mentioned in the problem statement, estimation of signature waveforms is essential for CDMA systems using multiuser detectors or adaptive multiuser detectors. In a changing environment, for example, when certain number of signals fail their CRC (cyclic redundancy code) checks, which indicates the occurrence of a drastic channel change, the parameters of multiuser detector or adaptive filters need to be re-calculated. Data efficient blind signature waveform estimation is highly desirable in this case.

There is an abundance of references in the literature on the problem of single user blind channel identification, the literature is not equally rich for CDMA signature waveform estimation problems despite their practical significance. In the following, we present a method for closed-form signature waveform estimation. In particular, we show that the subspace of the output data matrix contains sufficient information for unique determination of the signature waveforms. For the sake of presentation simplicity, we first explain our approach based on a single antenna model and neglect the noise. Its extension to antenna array systems will be discussed briefly.

In a CDMA system with P user, the baseband output signal of a base station receiver can be written as $$y(t) = \sum_{i=1}^{P} \sum_{m=-\infty}^{\infty} s_i(m) w_i(t - mT_s) \quad (1)$$

where $s_i(m)$ is the information symbol sequence transmitted from the ith subscriber and $w_i(t)$ is its associated signature waveform. $T_s$ denotes the symbol duration.

Note that the signature waveform $w_i(t)$ is related to the user's spreading code and the channel impulse response as follows, $$w_i(t) = \sum_{l=1}^{L_c} c_i(l) h_i(t - lT - \delta t_i) \quad (2)$$

where T is the chip duration, $\{c_i(1), c_i(2), \ldots, c_i(L_c): c_i(l) = \pm 1\}$ is the spreading code that is known to the receiver, $L_c$ the code length, and $h_i(t)$ the unknown composite channel response. It is generally plausible to model $h_i(t)$ as an impulse response (FIR) filter with a finite support: [0 LT]. Consequently, $w_i(t)$ has support: $[0 \ (L_c+L-1)T]$. In a synchronous CDMA system, direct paths from all users are synchronized within a fraction of the chip duration T. Therefore, we may assume that $\delta t_i \in [-T/4 \ T/4]$.

Sample $y(t)$ at the chip rate ($t=iT-t_0$, $i=1, 2, \ldots$,) starting at $t_0=T/2$, and introduce notation for an equivalent discrete time model $$y(n) = [y(n, 1), y(n, 2), \ldots, y(n, L_c)]^T, \quad y(n, k) = y(nT_s + kT - t_0); \quad (3)$$

$$w_i = [w_i(1), w_i(2), \ldots, w_i(L_c + L - 1)]^T, \quad w_i(k) = w_i(kT - t_0);$$

$$h_i = [h_i(1), h_i(2), \ldots, h_i(L)]^T, \quad h_i(k) = h_i(kT - t_0 - \delta t_i).$$

The problem of interest here is to estimate $\{w_i\}$ from $y(n)$. The data vector $y(n)$ contains $L_c$ samples within one symbol period, $$y(n) = \sum_{i=1}^{P} \begin{bmatrix} w_i(1) & \ldots & w_i(L-1) & w_i(L) & \ldots & w_i(L_c) \\ w_i(L_c+1) & \ldots & w_i(L_c+L-1) & 0 & \ldots & 0 \end{bmatrix}^T \begin{bmatrix} s_i(n) \\ s_i(n-1) \end{bmatrix}. \quad (4)$$

In most PCS applications, intersymbol interference (ISI) is negligible since the maximum delay spread is insignificant relative to the symbol period, e.g., $L \ll L_c$. A major part of $y(n)$, namely, $$x(n) \stackrel{def}{=} \begin{bmatrix} y(n, L) \\ \vdots \\ y(n, L_c) \end{bmatrix} = \sum_{i=1}^{P} \begin{bmatrix} w_i(L) \\ \vdots \\ w_i(L_c) \end{bmatrix} s_i(n) \stackrel{def}{=} \sum_{i=1}^{P} w_i s_i(n) \quad (5)$$

is unaffected by the ISI.

To estimate the signature waveform distorted by interchip interference (ICI), note that from (2), $$w_i(k) = \sum_{l=1}^{L_c} c_i(l)h_i(k-l) = \sum_{l=1}^{L} h_i(l)c_i(k-l), \quad k = 1, \ldots, L_c + L - 1. \quad (6)$$

Therefore $$w_i = \underbrace{\begin{bmatrix} c_i(L) & \cdots & c_i(1) \\ c_i(L+1) & \cdots & c_i(2) \\ \vdots & \vdots & \vdots \\ c_i(L_c) & \cdots & c_i(L_c - L + 1) \end{bmatrix}}_{c_i} h_i, \quad (7)$$

which suggests that $\overline{w}_i$ (or $w_i$) is uniquely determined by the unknown channel vector $h_i$. The signature waveform estimation problem now transforms to the channel vector estimation problem.

Given N data vectors, we have $$X = [x(1)\,x(2)\ldots x(N)] = \underbrace{[w_1 w_2 \ldots w_P]}_{w} \underbrace{\begin{bmatrix} s_1(1) & s_1(2) & \cdots & s_1(N) \\ s_2(1) & s_2(2) & \cdots & s_2(N) \\ \vdots & \vdots & \vdots & \vdots \\ s_P(1) & s_P(2) & \cdots & s_P(N) \end{bmatrix}}_{s}. \quad (8)$$

The following observations lay the groundwork of our proposed method. Apply a subspace decomposition to the data matrix X:

$$X = WS = (U_s \; U_o) \begin{pmatrix} \Sigma_s & 0 \\ 0 & 0 \end{pmatrix} \begin{pmatrix} V_s^H \\ V_o^H \end{pmatrix} \quad (9)$$

where $(\cdot)^H$ denotes Hermitian, the vectors in $U_s$, associated with the P non-zero singular values, span the signal subspace defined by the columns of W; while the vectors in $U_O$, associated with the zero singular values, span the orthogonal subspace which is the orthogonal complement of the signal subspace, we obtain $$U_o \perp W \Rightarrow U_o^H w_i = 0, \quad i = 1, \ldots, P. \quad (10)$$

The dimensions of $U_s$ and $U_o$ are $(L_c-L) \times P$ and $(L_c-L) \times (L_c-L-P)$, respectively. Substituting $w_i = C_i h_i$ into (10) yields $$U_o^H C_i h_i = 0, \; i=1, \ldots, P. \quad (11)$$

The above equation set has $(L_c-L-P)$ equations and L unknowns. Therefore, if $P \leq L_c - 2L$, (11) is generally overdetermined and hence has an unique nontrivial solution: $h_i$ subject to $\|h_i\|=1$.

In other words, the channel vector can be identified up to a scalar ambiguity. The proposed signature waveform estimation approach is summarized below, 1. Calculate the orthogonal subspace $U_o$ by applying singular value decomposition to X, or equivalently, eigenvalue decomposition to $XX^H$.

2. For each user, estimate the channel vector $h_i$ by solving the linear equation set in (11). In the presence of noise, $h_i$ can be estimated as the least squares solution of (11).

3. Reconstruct the signature waveform vector $\{w_i\}$ by (6).

Remarks:

1. The principal advantage of above approach is that it can provide closed-form signature waveform estimates with minimum data samples, thus making it suitable for fast system recovery during a drastic environment change, which is typical in fast moving mobile scenarios. In particular, it can determine the signature waveforms within P symbol periods.

2. $P \leq L_c - 2L$ is only required in single antenna systems with the sampling rate 1/T. The proposed algorithm can be easily extended to handle an overload system ($P > L_c$) by means of spatial oversampling (e.g., multiple antennas, as will be shown in the ensuing discussion) and/or temporal oversampling.

3. The $L \ll L_c$ condition, though valid in most PCS applications, can be relaxed by stacking data samples within two (or more) symbol periods:

$$x(n) = [y(n, L), \ldots, y(n, L_c), y(n+1, 1), y(n+1, 2), \ldots, y(n+1, L_c)]_T.$$

Regardless of the value of L ($0 \leq L \leq L_c$), the span of each user is defined by vectors below $$\begin{bmatrix} w_i(L+1) & \cdots & w_i(L_c) & w_i(L_c+1) & \cdots & w_i(L_c+L-1) & 0 & \cdots & 0 \\ 0 & \cdots & 0 & w_i(1) & \cdots & w_i(L) & w_i(L+1) & \cdots & w_i(L_c) \end{bmatrix}^T.$$

Therefore, by correspondingly modifying (10) and (11), the proposed subspace approach still applies, even to an asynchronous system.

Figure 5:
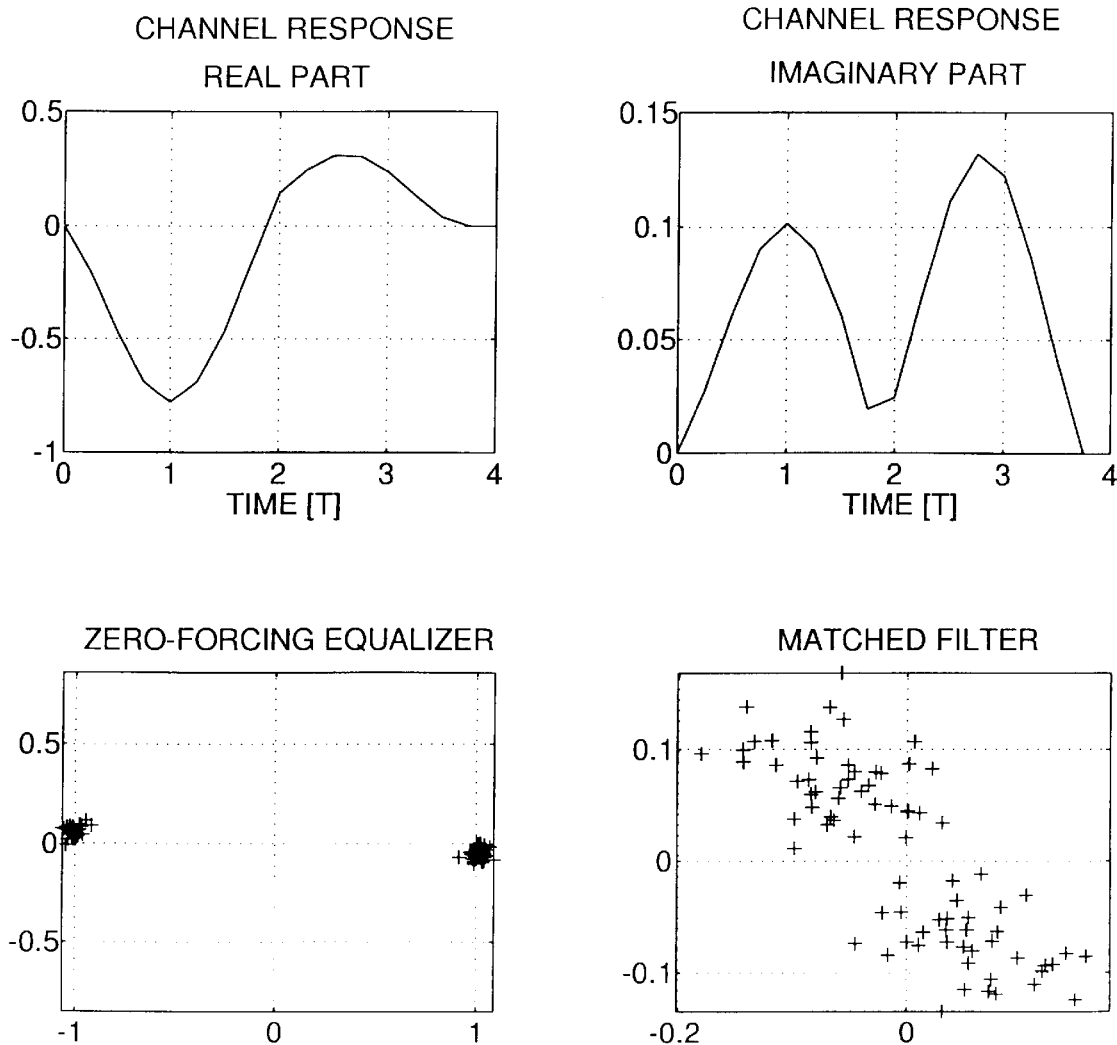
FIG. 5 is a graphic illustration of the signal estimates from a simulation performed in accordance with the invention in which signals from fifty subscribers were impinging on an array of two elements and the information bearing symbols were being estimated through blind signature waveform estimation.

We simulated a single receiver S-CDMA system with $L_c=32$, P=25, SNR=5 dB, and $\delta t_i$ uniformly distributed within $[-T/4 \; T/4]$. For each user, the multipath delay and the number of multipath components were uniformly distributed within [0 3T] and [1 10], respectively. We applied 40 data vectors to the above method for channel estimation. After $\{h_i\}$ were determined, the signature vectors $\{w_i\}$ were reconstructed. We then applied a simple zero-forcing receiver (decorrelator) to recover the original signals. FIG. 5 illustrates the channel responses used in the simulations and processing results for one of the users. The energy distribution of the channel suggests the existence of strong multipath signals. Comparing the signal constellations using zero-forcing equalizer and conventional matched filter, the proposed method clearly accomplished satisfactory signature waveform estimation.

The above method is straightly applicable to multireceiver systems. Given data measurements from an array of antennna or/and oversampled receiver outputs, we can in principle stack the data matrices from all M (M>1) physical or virtual receivers, and define new signature waveform vectors and channel vectors as follows, $$X = \begin{bmatrix} X^1 \\ \vdots \\ X^M \end{bmatrix}, \; w_i = \begin{bmatrix} w_i^1 \\ \vdots \\ w_i^M \end{bmatrix}, \; h_i = \begin{bmatrix} h_i^1 \\ \vdots \\ h_i^M \end{bmatrix}. \quad (12)$$

$X=[w_1 \ldots w_P]S=WS$ still holds, so does the subspace space relation between X and W. However, the number of orthogonal vectors in $U_o$ has be substantially increased to $M(L_c-L)-P$. It can be easily shown that $h_i$ is the solution of $$U_o^H \begin{bmatrix} C_i & & 0 \\ & \ddots & \\ 0 & & C_i \end{bmatrix} h_i = 0.$$

All signature waveforms can then be calculated correspondingly.

What is claimed is:

1. A method of estimating signature waveforms in CDMA communications comprising the following steps:
   obtaining signal measurements of uplink signals transmitted by CDMA subscriber units with a base station receiver;
   constructing from the signal measurements a data matrix containing a plurality of data vectors, each data vector being comprised of either the signal measurements within a symbol duration, or a covariance matrix from the data matrix;
   finding vectors of a null space of either the data matrix or the covariance matrix using subspace decomposition methods;
   calculating a channel vector for each subscriber unit with a kernel matrix and the vectors of the null space; and
   reconstructing the signature waveforms from the channel vectors and the kernel matrix;
   whereby transmitted symbol sequences from all subscribers and their associated propagation characteristics can be determined from the channel vectors and signature waveforms.

2. The method according to claim 1 wherein the subspace decomposition methods of said step of finding includes eigenvalue decomposition of the covariance matrix and singular value decomposition of the data matrix.

3. The method as defined in claim 1 for further estimating signature waveforms in a multi-receiver system, wherein said step of constructing further comprises the step of forming the data matrix from signal measurements from an antenna array.

4. A CDMA wireless system including a base station for receiving uplink signals transmitted by subscribers comprising:
   receiving means including a plurality of receiving antennas at the base station for obtaining measurements of superposed arriving signals from the subscribers;
   processing means at the base station for processing the measurements, said processing means including dedicated digital signal processors for determining signature waveforms of all the subscribers by:
     obtaining signal measurements of uplink signals transmitted by CDMA subscriber units with said receiver means;
     constructing from the signal measurements a data matrix containing a plurality of data vectors, each data vector being comprised of either the signal measurements within a symbol duration, or a covariance matrix from the data matrix;
     finding vectors of a null space of either the data matrix or the covariance matrix using subspace decomposition methods and determining vectors of the null space in response thereto;
     calculating a channel vector for each subscriber unit with a kernel matrix and the vectors of the null space;
     reconstructing the signature waveforms from the channel vectors and the kernel matrix; and
     calculating multiuser receivers for each subscriber based on the signature waveforms; and
   detection means for detecting transmitted symbol sequences using said multiuser receivers distributed from the dedicated digital signal processors.

* * * * *